United States Patent [19]

Muller

[11] Patent Number: 4,651,790

[45] Date of Patent: Mar. 24, 1987

[54] MACHINING ELONGATE RODS

[76] Inventor: Karl Muller, Westerbraker Strasse 4, 3452 Kirchbrak, Fed. Rep. of Germany

[21] Appl. No.: 805,704

[22] Filed: Dec. 6, 1985

[30] Foreign Application Priority Data

Dec. 6, 1984 [DE] Fed. Rep. of Germany ....... 3444519

[51] Int. Cl.⁴ .............................................. B27K 1/00
[52] U.S. Cl. ................................. 144/363; 83/411 R; 83/430; 144/2 R; 144/375; 144/379
[58] Field of Search ............... 83/411 R, 430; 144/39, 144/41, 359, 363, 374, 375, 379, 2 R

[56] References Cited

U.S. PATENT DOCUMENTS 4,296,660 10/1981 Cristiani ........................... 83/411 R Primary Examiner—W. D. Bray
Attorney, Agent, or Firm—Penrose Lucas Albright

[57] ABSTRACT

A device for machining elongate rods has a feed means defined by a track and a plurality of V belts which feeds the rods in an uninterrupted succession one behind the other in a feed direction transverse to their longitudinal axes. The track defines a an arc of a circle adjacent the machine tools which is parallel to the circular machining path of cutting elements of the machine tools.

6 Claims, 4 Drawing Figures

MACHINING ELONGATE RODS

BACKGROUND OF THE INVENTION

Technical Field

The present invention relates to a method as well as to a device for machining elongate rods, particularly wooden rods of circular cross-section.

SUMMARY OF THE INVENTION

An object of the invention is to provide a method and a device for machining elongate rods which provides a better performance than existing methods and devices.

The present invention provides a device for machining elongate rods having a substantially circular profile including
- a plurality of machine tools spaced in a longitudinal direction, each having a machining tool element which follows a substantially circular machining path,
- drive means,
- feed means for feeding the rods in a feed path transverse to their longitudinal axes, said feed means being defined by a track and a plurality of endless belt means spaced in said longitudinal direction, and
- two sets of wheels each including a corresponding plurality of wheels, one said set of wheels being operatively connected to said drive means, each said belt means being supported by a respective wheel on each said set, said rods being transported to and past the machine tools between said track and said belts, said track defining an arc of a circle parallel to said circular machining path adjacent said machine tools.

The invention also provides a method of machining rods with a plurality of machine tools including the steps of feeding the rods towards the machine tools by rolling them one behind the other in an uninterrupted succession over a track which defines an arc of a circle in the direction of feed, in the region of the machine tools, the feeding arc extending parallel to a circular machining path followed by machining elements of the machine tools.

Advantageously, the belt means have a surface facing the rods roughened or provided with transverse grooves, the cross-section of which is preferably matched to the diameter of the rods. By this means, any slipping between the belt means and the rods being fed is prevented.

Preferably, that part of the track lying adjacent the machine tools is ridged on its surface facing the rods. By this means it is ensured that the rods rotate about their longitudinal axis in the machining area.

In a preferred embodiment the wheels of one set are mounted on a drive shaft and the other set is mounted free to float about the drive shaft. As a result of this mounting the feed can be adapted for rods of different diameters.

An embodiment of method and device for machining elongate rods will now be described, by way of example only.

DESCRIPTION OF A PREFERRED EMBODIMENT

Figure 1:
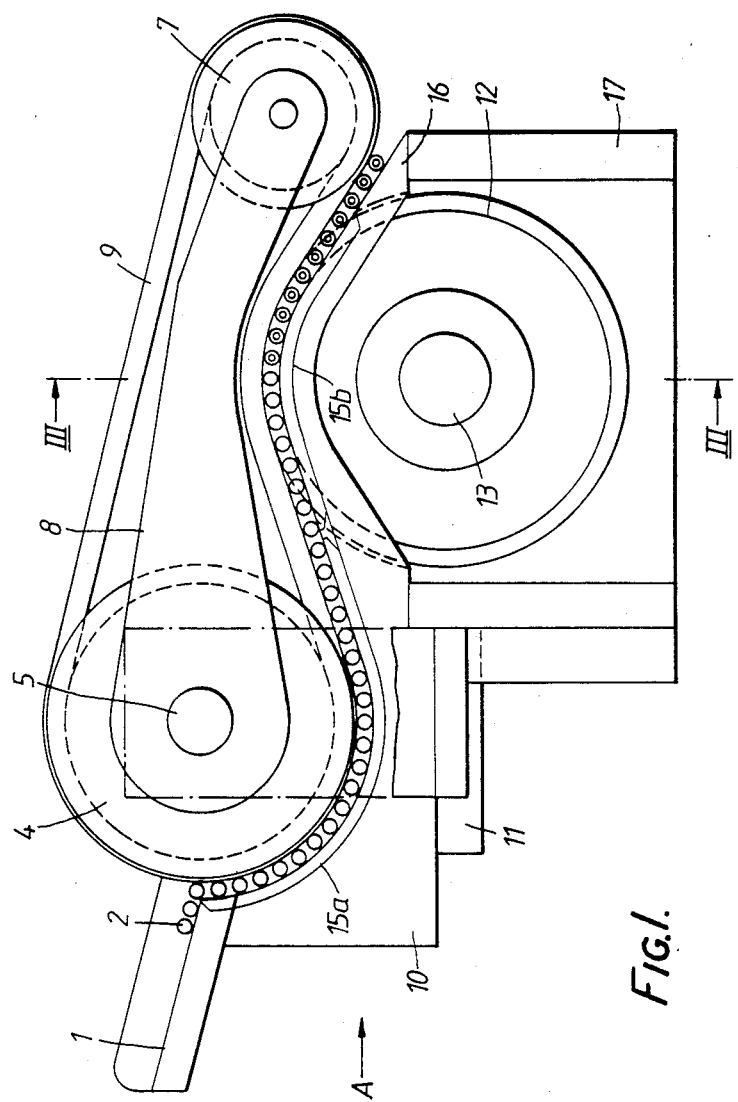
FIG. 1 is a side sectional view of a device in accordance with the invention for machining elongate rods.
Figure 2:
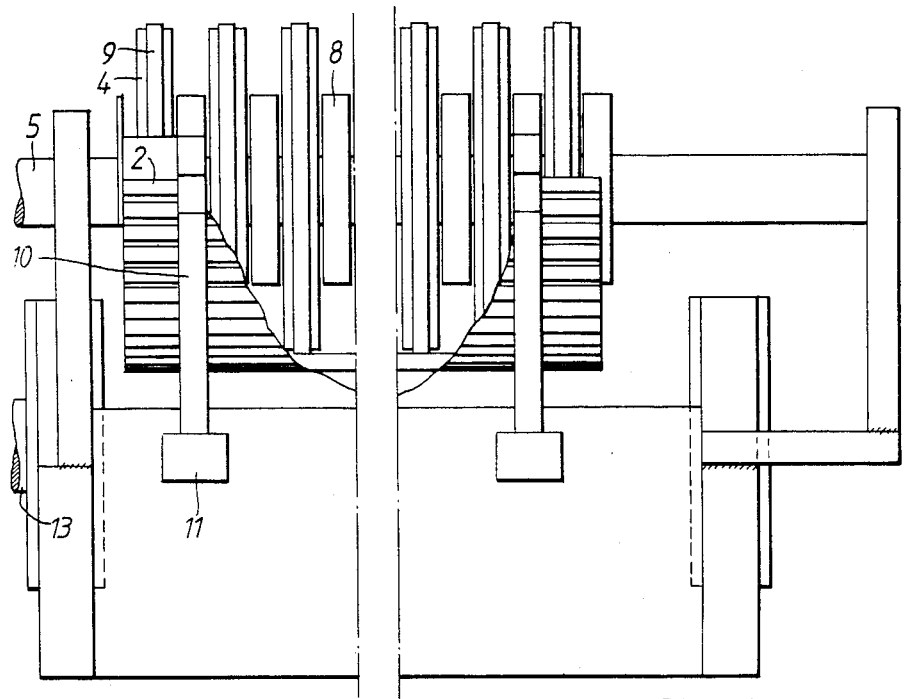
FIG. 2 is a partially cut-away front view in the direction A of the device of FIG. 1.

The method and device for machining elongate rods will be described below with particular reference to the machining of elongate wooden rods of circular cross-section to manufacture wooden dowels which are produced by cutting the wooden rods transversely to appropriate lengths.

Elongate wooden rods 2 are supplied to a receiving section 1 of a feed means defined between facing surfaces of a plurality of V-belts 9 and a track 15. The rods are initially disposed with their longitudinal axes transverse to the feed direction so that they roll from the receiving section 1 into the part 15a of the carrier track in a substantially uninterrupted succession.

A first set 4 consists of longitudinally spaced individual V-belt wheels which are disposed on a common drive shaft 5. The wheels are spaced from one another by a distance which corresponds to the desired length of the dowels. The drive shaft is operatively connected to a suitable drive means (not shown).

A second wheel set 7 is associated with wheel set 4. Wheel set 7 consists of longitudinally spaced wheels of the same type as the wheels of set 4. In the case illustrated these are all V-belt wheels. The spacing of the wheels in set 7 is the same as that of the wheels in set 4. Each one of the V-belt wheels of the set 7 is rotatably mounted on a respective arm 8. Each arm is pivotally mounted to the drive shaft 5. By means of this special mounting the wheel set 7 is mounted free to float about the drive shaft 5 in such a manner that it can move upwards and downwards and, therefore, rods of different diameters can be accommodated between the track and the V-belts 9.

Each V-belt 9 is passed around a respective pair of oppositely disposed wheels, one from each of the wheel sets 4 and 7. Instead of the V-belts 9, other belt means such as flat belts, bands, chains or the like may be used. When different belt means are used the individual wheels of the wheel sets 4 and 7 have to be constructed accordingly.

The V-belts 9 are appropriately roughened on their outer surface which contacts the rods. Alternatively the belts are provided with transverse grooves of any cross-section but preferably sized to correspond with the diameter of the rods being fed. The roughening or grooving increases the frictional engagement of the belts with the wooden rods 2.

Figure 3:
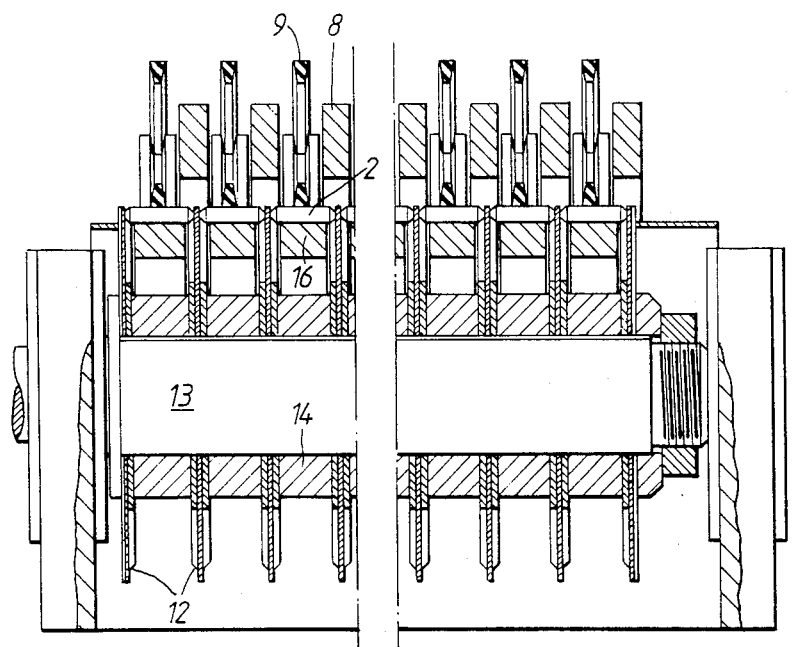
FIG. 3 is a partial section along line III—III in FIG. 1.
Figure 4:
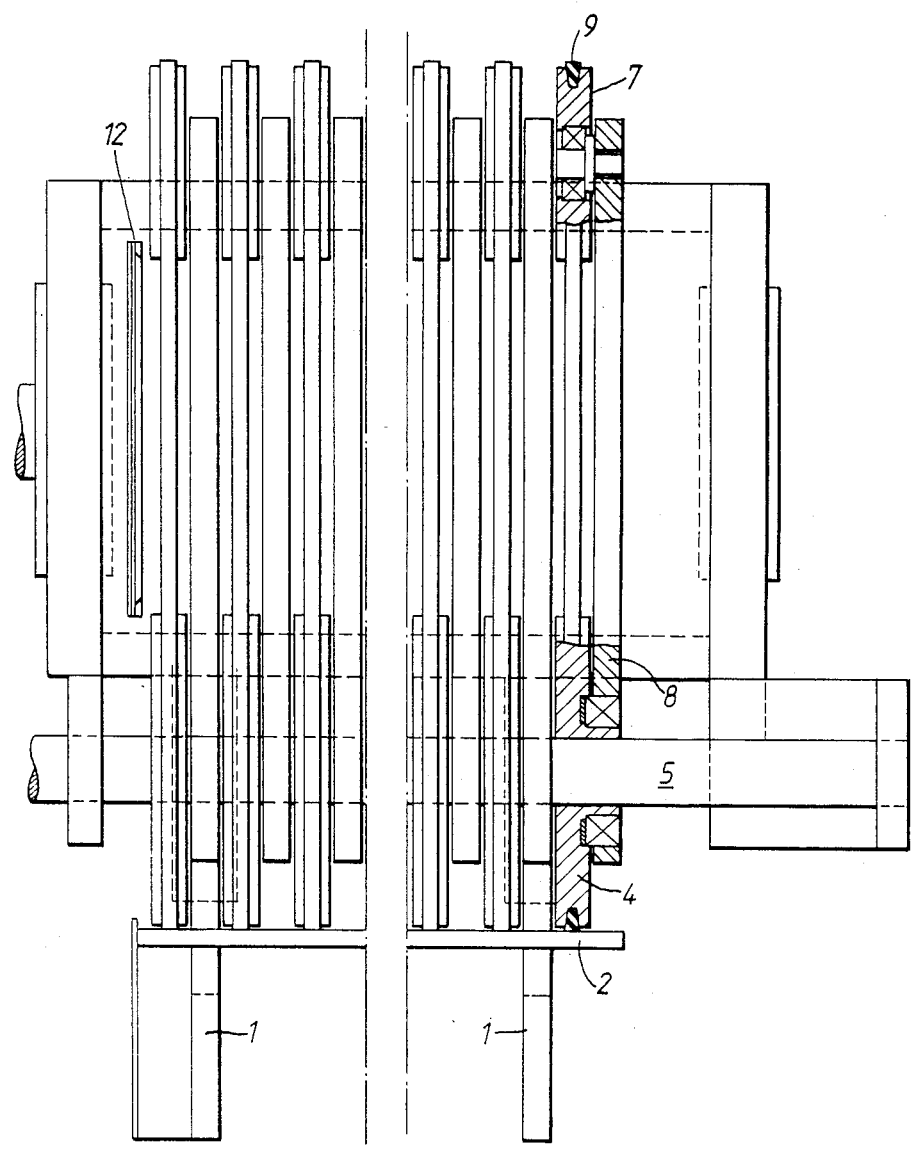
FIG. 4 is a partial top view of the device according to FIG. 1.

As illustrated in FIG. 3 side milling cutters 12 are provided as the machine tools. The tools are detachably and lockingly connected with a longitudinal drive shaft 13. Appropriately, a tongue and groove connection is provided for this purpose, the tongue being a part of the drive shaft 13, whereas the corresponding grooves are incorporated into the hubs of the individual side milling cutters 12. The side milling cutters are disposed on the drive shaft 13 spaced one from the other, provision being made between the individual side milling cutters 12 for spacers 14, the length of which determines the length of the dowels to be made. The machine tools can be selected for any required machining process. If, as in the present case, the wooden rods 2 are to be cut to provide dowels, side milling cutters 12 are disposed on the drive shaft 13. Suitable machine tools will have to be selected when no cutting off is to be performed, but hollow throats or the like are to be incorporated into the individual wooden rods 2. Naturally, it is also possible to effect a combination of separation cuts and hollow throats. It will be appreciated that the cutting elements of all these machine tools follow a circular machining path.

During the machining operation the wooden rods 2 are rolled along the track uninterruptedly one behind the other. The track consists of the transport area 15a and a machining area 15b. In the machining area 15b, the track when seen in a section along the feeding direction as shown in FIG. 1, is in the form of an arc of a circle which is arched upwards, extending parallel with the circular cutting path of the cutting elements of the machine tools. This is important, because it ensures that the depth of machining of the surface of the rods 2 by the tools is even. In this way, in the case of manufacture of dowels from the wooden rods 2, the rods 2 rolling down into the machining area 15b are not only cut but also evenly provided with grooves extending around their ends so as to produce an even chamfering of the ends of the finished dowels.

The track is constructed in the machining area 15b by bridge-shaped bearing members 16 which are disposed transversely spaced in the longitudinal direction with a sufficient gap between them to allow the passage of the machine tool cutting elements. Each end of the bearing members 16 rests against a base 17 to which it is removably connected so that it is easily possible to exchange the bearing members 16. The upper surfaces for the bearing members 16 define the track which supports the wooden rods. The part of the track lying in the machining area 15b is in this construction ridged on the upper surface facing the wooden rods 2. The ridging has not been shown on the drawing for a better overall view.

The area 15a of the track is in the shape of a downwardly-arched arc of a circle, extending parallel with the periphery of the driving wheels of set 4. The distance between the track 15a and the belt means 9 is the diameter of the rods 2. Here the track is defined by upstanding plates 10 the upper edge surfaces of which define the track. The plates 10 are removably connected with a base plate 11. Preferably the arc-shaped edge surfaces of these plates 10 is also slightly roughened so as to increase frictional resistance.

In operation of the above described device, wooden rods 2 to be processed into dowels are fed onto the receiving section 1. The drive shaft 5 is driven in rotation, with the consequence that the V-belt wheels are driven in rotation and therefore the endless V-belts 9 associated with these V-belt wheels are also set into motion. The motion of the V-belts causes the wooden rods 2 to be transported along track area 15a to the machine tools 12 one behind the other. Thus the individual wooden rods 2 move first along the transport area 15a to the machining area, in which they are pressed by the endless V-belts 9 against the surfaces of the bridge-shaped bearing members 16. As a result of the frictional locking the wooden rods 2 are rotated during machining about their longitudinal axes and are simultaneously cut into dowels 12 by the individual milling cutters 12. The cut dowels are fed out of the device at the end of the bridge-shaped bearing members 16.

I claim:

1. A device for machining elongate rods having a substantially circular profile including
   a plurality of machine tools spaced in a longitudinal direction, each having a machining tool element which follows a substantially circular machining path,
   drive means,
   feed means for feeding the rods in a feed path transverse to their longitudinal axes, said feed means being defined by a track and a plurality of endless belt means spaced in said longitudinal direction, and
   two sets of wheels each including a corresponding plurality of wheels, one said set of wheels being operatively connected to said drive means, each said belt means being supported by a respective wheel of each said set, said rods being transported to and past the machine tools between said track and said belts, said track defining an arc of a circle parallel to said circular machining path adjacent said machine tools.

2. A device according to claim 1, wherein a surface of said belt means facing the rods is roughened or defines transverse grooves.

3. A device according to claim 1, wherein that part of the track lying adjacent said machine tools is ridged on its surface facing the rods.

4. A device according to claim 1, further including a drive shaft connected to said drive means, said wheels of said one set being mounted on said drive shaft, and means operatively connected to said drive shaft for mounting the other set of wheels so that they are free to float around said drive shaft.

5. A device according to claim 1, wherein the track adjacent said one set of wheels is defined by surfaces of a plurality of plates spaced in said longitudinal direction and detachably connected with a base plate.

6. A method of machining rods with a plurality of machine tools including the steps of feeding the rods towards the machine tools by rolling them one behind the other in an uninterrupted succession over a track which defines an arc of a circle in the direction of feed, in the region of the machine tools, the feeding arc extending parallel to a circular machining path followed by machining elements of the machine tools.

* * * * *